US009193542B2

(12) United States Patent
Covizzi (10) Patent No.: US 9,193,542 B2
(45) Date of Patent: Nov. 24, 2015

(54) CHASSIS DIP TREATMENT STATIONS

(75) Inventor: Giampaolo Covizzi, Milan (IT)

(73) Assignee: GEICO S.P.A., Milan (IT)

( * ) Notice: Subject to any disclaimer, the term of this patent is extended or adjusted under 35 U.S.C. 154(b) by 0 days.

(21) Appl. No.: 13/984,988

(22) PCT Filed: Apr. 12, 2012

(86) PCT No.: PCT/EP2012/056635
§ 371 (c)(1),
(2), (4) Date: Aug. 12, 2013

(87) PCT Pub. No.: WO2012/146487
PCT Pub. Date: Nov. 1, 2012

(65) Prior Publication Data
US 2014/0190406 A1 Jul. 10, 2014

(30) Foreign Application Priority Data

Apr. 27, 2011 (IT) .............................. MI2011A0703

(51) Int. Cl.
*B05C 3/10* (2006.01)
*B65G 49/04* (2006.01)
(Continued)

(52) U.S. Cl.
CPC .............. *B65G 49/0409* (2013.01); *B05C 3/10* (2013.01); *B62D 65/18* (2013.01); *B65G 49/049* (2013.01); *C25D 13/22* (2013.01); *B65G 2201/0294* (2013.01)

(58) Field of Classification Search
CPC ....................................................... B05C 3/10
USPC .......... 118/423, 503, 416, 429, 426; 427/425, 427/242
See application file for complete search history.

(56) References Cited

U.S. PATENT DOCUMENTS 5,725,669 A 3/1998 Heckmann
6,372,107 B1 * 4/2002 Besinger et al. .............. 204/479
(Continued)

FOREIGN PATENT DOCUMENTS

DE 102010001366 A1 8/2011
EP 1424269 A2 6/2004
(Continued)

OTHER PUBLICATIONS

"J-Jump", Aug. 2011, XP055015305, Cinisello Balsamo, Milan, Italy <http://www.geico-spa.comjpdf/J-Jump.pdf>.
(Continued)

*Primary Examiner* — Yewebdar Tadesse
(74) *Attorney, Agent, or Firm* — Harness, Dickey & Pierce, PLC (57) ABSTRACT

A chassis dip treatment station may include a process liquid tank; a line configured to convey in sequence a plurality of skids inside and outside of the station, the skids each configured to support a chassis to be treated, the conveying line comprising roller units for displacing the skids, the skids configured to move between an operating position, for supporting and displacing the skids above the tank, and a retracted non-operating position, for immersing one of the skids with the chassis inside the tank; and a system configured to vertically move the skids conveyed above the tank using the conveying line, and configured to move the one of the skids with the chassis inside and outside of the tank. The system configured to vertically move the skids may include a platform configured to support and engage the skids. The platform may be mounted on a motor-driven, transverse, rotational shaft.

20 Claims, 6 Drawing Sheets

(51) Int. Cl.
    *B62D 65/18* (2006.01)
    *C25D 13/22* (2006.01)

(56) References Cited

U.S. PATENT DOCUMENTS 6,419,983 B1 * 7/2002 Kreuzer .................. 427/242
2007/0017746 A1 * 1/2007 Robbin .................... 187/203
2010/0200361 A1   8/2010 Tagliavento

FOREIGN PATENT DOCUMENTS

| | | | |
|---|---|---|---|
| EP | 2192989 A1 | 6/2010 | |
| JP | 2005289102 A | 10/2005 | |
| WO | WO-03/070545 A1 | 8/2003 | |
| WO | WO-2009/083081 A1 | 7/2009 | |
| WO | WO-2009/103400 A1 | 8/2009 | |

OTHER PUBLICATIONS

International Search Report PCT/ISA/210 for PCT/EP2012/056635 dated Jul. 4, 2012.

Written Opinion PCT/ISA/237 for PCT/EP2012/056635 dated Jul. 4, 2012.

* cited by examiner

CHASSIS DIP TREATMENT STATIONS

CROSS-REFERENCE TO RELATED APPLICATION(S)

This application is a national stage entry from International Application No. PCT/EP2012/056635, filed on Apr. 12, 2012, in the Receiving Office of the European Patent Office, which claims priority from Italian Patent Application No. MI2011A000703, filed on Apr. 27, 2011, in the Italian Patent and Trademark Office, the entire contents of both of which are incorporated herein by reference.

The present invention relates to a station for dip treatment of chassis, in particular of cars and the like.

In the art the dip treatment of chassis, in order to perform, for example, anti-corrosive and pre-treatment and cataphoresis, is known.

The end quality of the dip treatment depends to a large extent on the mode of immersion of the part to be treated. For example, to ensure uniformity of the treatment it is extremely important to avoid the presence of air bubbles which may remain trapped during immersion. In fact, the trapped bubbles would prevent suitable contact of the treatment liquid with the immersed chassis. Moreover, it is important that there should not be zones with an excessive amount of stagnating liquid when the chassis emerges, in order to prevent both unnecessary dripping along the line and non-uniform and excessive coating. The difficulty of achieving satisfactory results becomes even greater in the more awkward zones of box-shaped parts.

Moreover, the mode and speed of immersion and emersion are important also in order to minimize the mechanical stresses which are induced on the chassis by the hydrodynamic resistance and which may result in unacceptable deformation as well as excessive stressing of the movement structure.

On the other hand, it is also important that the station should perform treatment in a rapid as possible manner in order to optimize the processing time and increase productivity. Ensuring a suitable speed of treatment, however, conflicts with the need to ensure removal of all the air, prevent stagnation of liquid and reduce the hydrodynamic stresses.

An example of a known station envisages the use of travel ways along which suitable conveying units, called "skids", are moved, these skids each carrying a chassis to undergo treatment. The conveying line is substantially continuous and along the path varies in height so as to be immersed in one or more treatment baths. In this way, the chassis, following the path of the conveying line, enter into and out of the tanks along the path. This system has the drawback that it is very slow and requires relatively long tanks in order to allow entry and exit of the conveying system and also a suitable dipping time of the conveyed chassis. In addition to the size, the length of the tanks is also a problem owing to the high volume of process liquid which must be used, with consequent high costs for the acquisition and subsequent disposal thereof. Moreover, with a variation in the chassis to be treated, there is no possibility of optimizing the immersion and emersion movements in order to favour removal of the air, avoid the presence of bubbles and optimize the stresses.

WO 03/070545 describes a horizontal conveying line which has zones for downwards rotation of the chassis opposite treatment tanks. Such a line, however, is costly and slow and offers only the possibility of rotating the chassis about a middle transverse axis, with poor control of the immersion action in order to prevent air bubbles and an excessive amount of accumulated liquid.

WO2009/083081 and WO2009/103400 propose the use of a complex overhead conveyor with a plurality of carriages which have raising arms which hang downwards and terminate in a support element which is rotatable about a horizontal axis and to which the chassis is attached. The overhead conveyor travels along a line and passes above one or more process tanks. When a carriage is located vertically above the tank it lowers the support element with the chassis so as to immerse the chassis inside the tank, while it inclines or rotates it by means of the motor-driven support element. The horizontal movement of the carriage may continue with chassis being immersed until it emerges at the opposite end of the tank. This plant is very bulky and costly and nevertheless has a low productivity since the number of carriages must be necessarily limited owing to the cost and the space occupied. In order to allow the inclination or rotation of the chassis and ensure a sufficient chassis immersion time, the tanks must in any case be relatively long, with the consequent problems already mentioned above. Moreover, the operations of loading and unloading the chassis from the suspended rotating support element are necessarily relatively time-consuming.

Other systems which envisage a system separate from the conveyor for overturning the chassis inside the tanks do not solve the problem of rapid loading and unloading of the chassis onto/from the overturning system and/or do not ensure a suitable flexibility as regards the immersion movements in order to avoid bubbles or stagnation.

EP 2192989 proposed using a platform supported at the corners by four columns each provided with an independent elevator such that the platform moves only vertically and may be inclined by means of an independent control system for the four elevators. A horizontal conveying system loads and unloads the platform which, owing to the separate control of the four elevators, may immerse the chassis vertically with various inclinations which can be varied depending on the chassis being treated. The processing tank may thus be small, it being sufficient for it to accommodate the chassis, and removal of the air and stagnation of the liquid may be controlled in an optimum manner. The cost, dimensions and efficiency are significantly improved compared to the previous solution and several tanks may also be arranged in series, each with their own vertically moving platform. This solution, however, is not optimum for the immersion of all types of chassis and nevertheless has a certain cost and occupies a large amount of space owing to the four independent elevators.

The general object of the present invention is to provide a dip treatment station which, while occupying a relatively small volume and at a relatively low cost, is able to ensure a high degree of flexibility and quality of treatment also with a large range of different chassis.

In view of this object the idea which has occurred, according to the invention, is to provide a chassis dip treatment station, comprising a process liquid tank; a line for conveying in sequence a plurality of skids inside and outside of the station, the skids being intended to each support a chassis to be treated, the conveying line comprising roller units for displacing a skid, which are movable between an operating position for supporting and displacing the skid above the tank, and a retracted non-operating position for immersing the skid with the chassis inside the tank; a system for vertical movement of a skid which has been conveyed above the tank by means of the conveying line, for moving the skid with the chassis inside and outside of the tank; characterized in that the vertical movement system comprises a platform for supporting and engaging with the skid, which is mounted on a motor-driven, transverse, rotational shaft, the shaft projecting close to the bottom end of a vertical support arm, the vertical arm being motor-driven for the vertical movement of the platform inside and outside of the tank.

In order to illustrate more clearly the innovative principles of the present invention and its advantages compared to the prior art, an example of embodiment applying these principles will be described below, with the aid of the accompanying drawings. In the drawings.

Figure 1:
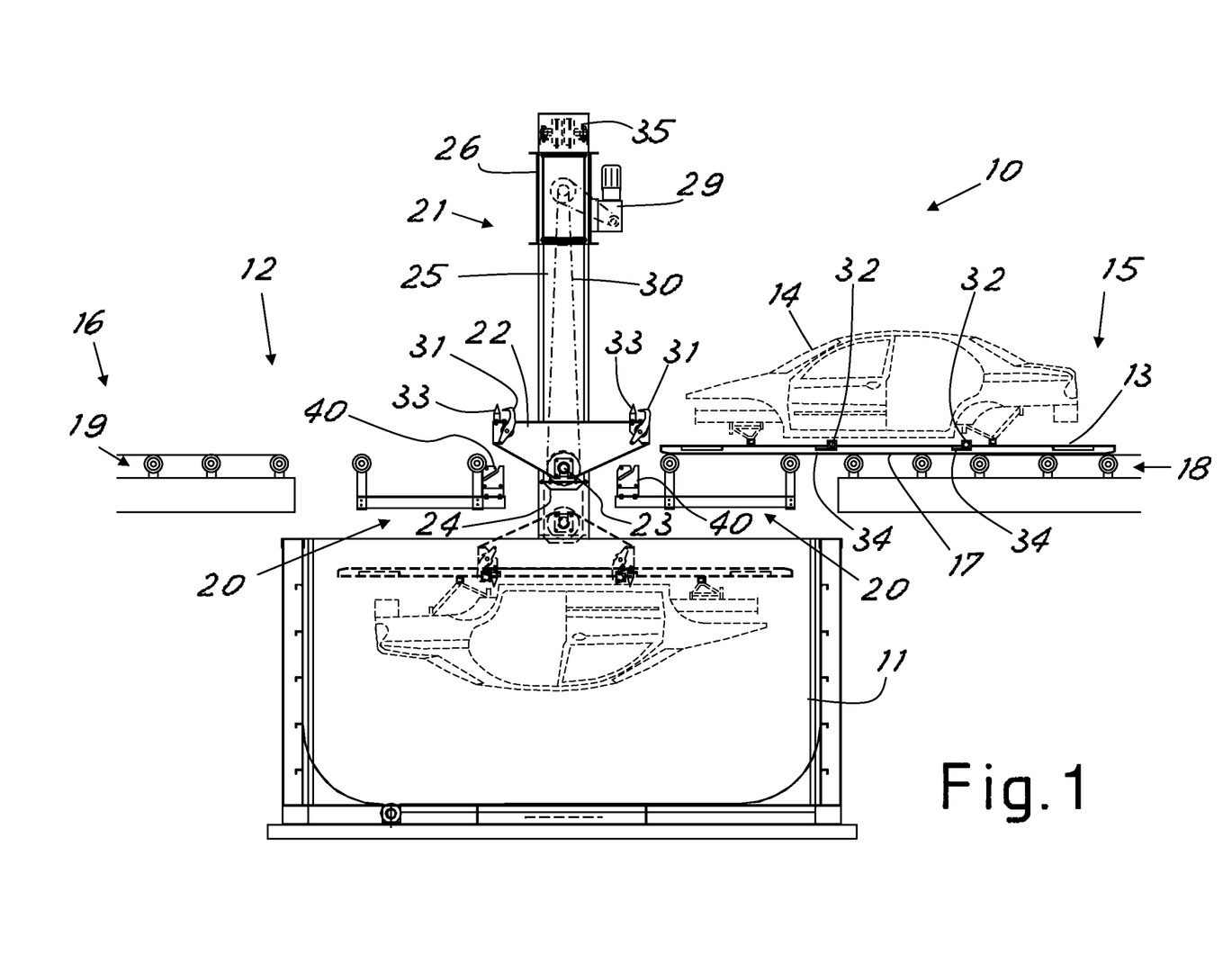
FIG. 1 shows a schematic, partially cross-sectioned, side view of a station according to the invention.

With reference to the figures, FIG. 1 shows a station, generally denoted by 10, for the dip treatment of chassis, in particular of cars and the like. In the present description reference will be made to a car chassis, but it is understood that the innovative principles of the present invention may also be applied to different chassis, for example chassis of lorries.

The station 10 comprises a suitably sized tank 11 filled with a known process liquid suitable for the particular application carried out on the chassis, for example an anti-corrosive treatment or pre-treatment or cataphoresis.

A sequential conveying line 12 conveys in sequence inside and outside of the station a plurality of skids 13 (of which, for the sake of simplicity, only one is shown in the drawings) with a chassis 14 arranged on top. In particular the line will convey a skid with a chassis to be treated into the station from an entry end 15 and will remove the skid with the chassis, following treatment, at an opposite exit end 16.

Each skid is intended to support a chassis to be treated and will be provided with suitable known systems for fixing the chassis onto it, these not being further described or shown here since they can be easily imagined by the person skilled in the art. As is known, the skids comprise a pair of parallel bottom runners 17 intended to travel along rollerways.

The conveying line 12 comprises corresponding rollerways 18, 19 which lead to the entrance 15 and depart from the exit 16 of the station.

The line also comprises in the station 10 roller units 20 for displacing the skid inside the station, said units being movable, as will be explained below, between an operating position where they support and move the skid above the tank 11 between the travel ways 18 and 19 and a non-operating retracted position where the skid with the chassis can pass vertically for immersion thereof inside the underlying tank 11.

The station also comprises a system 21 for vertically moving a skid which has been conveyed above the tank by means of the conveying line 12, for moving the skid with the chassis inside and outside of the tank 11.

Figure 2:
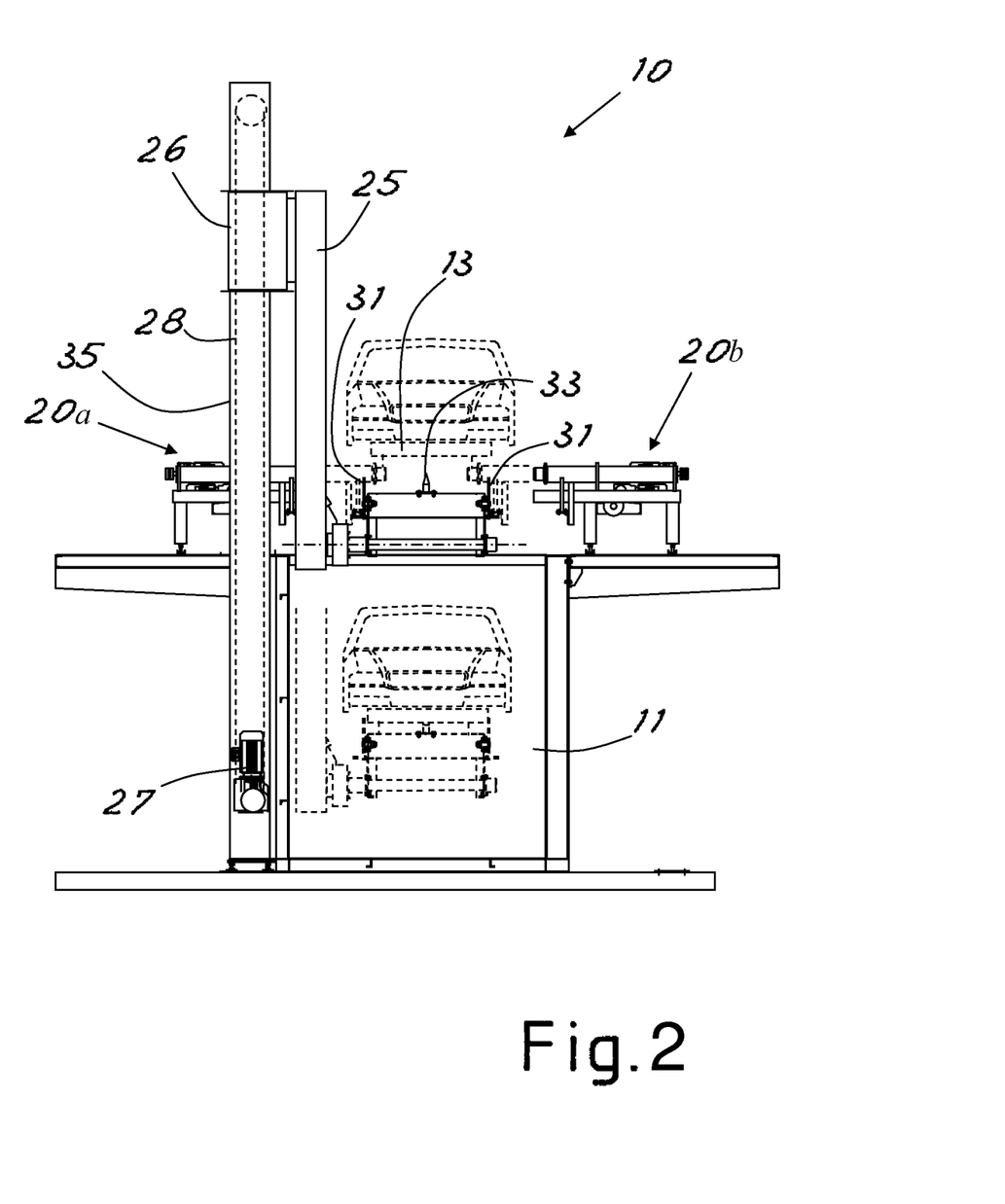
FIG. 2 shows a schematic, partially cross-sectioned, front view of the station according to FIG. 1.
Figure 3:
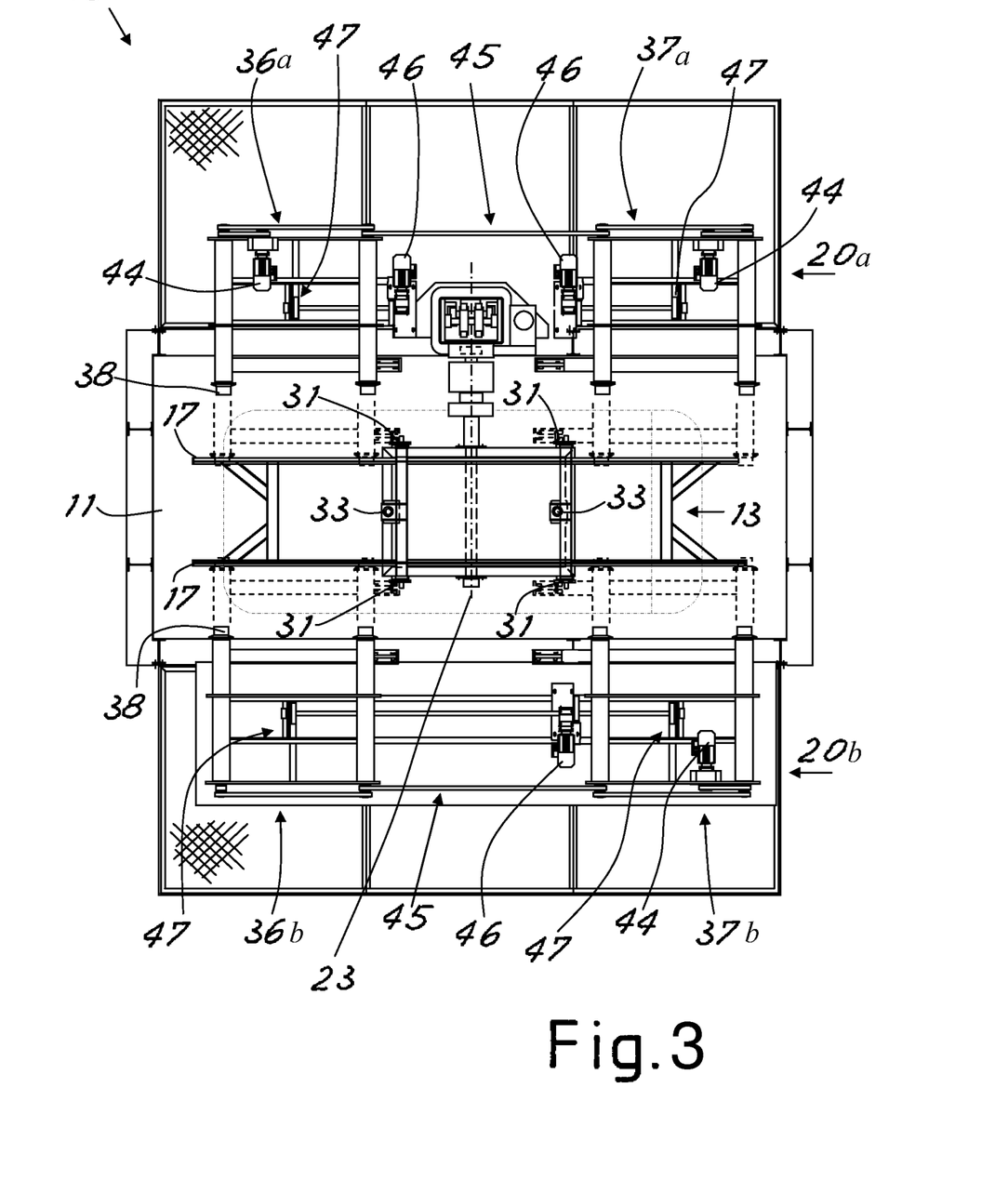
FIG. 3 shows a schematic, partially cross-sectioned, plan view of the station according to FIG. 1.

As can be clearly seen in FIGS. 1, 2 and 3 (for the sake of clarity in FIG. 2 the skid is shown only in broken lines, while in FIG. 3 the rollerways 18 and 19 are not shown), the vertical movement system 21 comprises a platform 22 for supporting and engaging with the skid, which is mounted on a single motor-driven rotational shaft 23 which is horizontal and transverse to the extension of the skid (and therefore in general to the direction of movement of the skid between the entrance and exit).

The rotational shaft is preferably arranged in the middle of the front end and rear end of the platform and, advantageously, is offset with respect to the exact centre line of the platform in order to facilitate rotation in one direction.

The shaft 23 is in turn supported so as to project close to the bottom end 24 of at least one vertical support arm 25 which is driven so as to travel vertically for the vertical movement of the platform inside and outside of the tank. Advantageously, for the travel movement the vertical arm has its top end supported by a carriage 26 which is driven so as to travel vertically along a suitable vertical guide.

Advantageously a motor 27 performs, via a chain or toothed-belt drive 28, the vertical movement of the carriage 26, while a motor 29 performs, via a chain or toothed-belt drive 30, the rotation of the platform. Advantageously, the motor 29 is arranged at the top end of the arm 25 which is not immersed inside the tank and the chain drive is sealed so as to prevent damaging contact between the treatment liquid and the platform drive system.

The platform may thus be operated so as to rotate about the shaft 23 in order to incline the chassis.

Advantageously, the platform may be operated so as to rotate about the said motor-driven transverse shaft until the chassis on the skid is rotated upside down.

As can be seen in broken lines in FIG. 1, this rotation may be advantageously at least through 180° so as to achieve also the complete overturning of the chassis, when desired or required for the quality of the treatment.

Again advantageously, the carriage 26 travels along a vertical pillar 35 which is arranged alongside the tank and fixed to the ground.

In order to allow inclination or overturning of the chassis, the platform 22 comprises means for engaging with the skid so as to avoid inappropriate movements and falling of the skid onto the platform.

In the preferred embodiment described here, in order to form these engaging means, the platform comprises hooks 31 which are movable between an operating position for stable engagement of the skid on the platform and a non-operating position where it is disengaged. For engagement of the skid, the latter may be advantageously provided with laterally projecting pins 32 with which the hooking elements are coupled.

Means for moving the hooks between an operating position and non-operating position are also present in the station so as to perform the controlled movement of the engaging means at the appropriate time and engage the skid with the platform before immersion with rotation as well as disengage the skid at the end of treatment.

Advantageously, the engaging means may be operated, as will be clarified below, by the movement of the roller units 20 between the operating position and the non-operating position.

Centring pins 33 projecting vertically from the platform may also be advantageously provided so as to engage inside corresponding centring seats 34 in the skid and ensure correct relative positioning, avoid movements parallel to the surface of the platform and not exert an excess shearing stress on the hooks.

The hooks are thus required to perform only the separating movement of the platform and skid in a direction perpendicular to the platform (namely parallel to the axis of the centring pins) and are therefore simplified.

Figure 4:
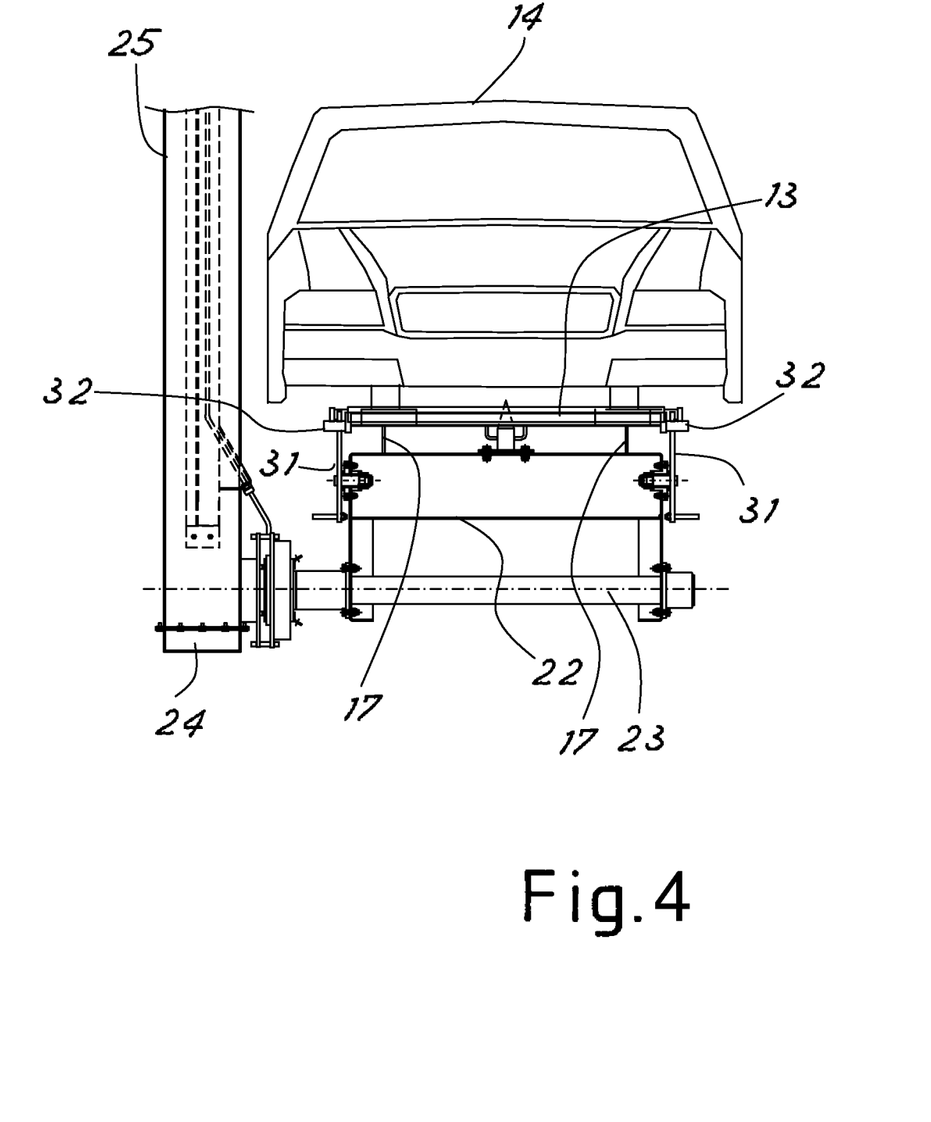
FIG. 4 shows an enlarged, schematic, front view of a movement part inside the station according to the invention.

As can be clearly seen in FIG. 4, the hooks are advantageously four in number and arranged in pairs close to the corners and on the two sides of the platform. The skid will have correspondingly four laterally projecting engaging pins 32.

As can be clearly seen in FIGS. 2 and 3, the roller units 20 are advantageously formed so as to comprise a side unit 20*a*, 20*b* on each side of the travel way of the conveying system (namely on each side of the longitudinal direction of travel for entry/exit of the chassis). Again advantageously, each side unit 20*a* and 20*b* is formed respectively by a front roller unit 36*a* and 36*b* and by a rear roller unit 37*a* and 37*b* along the conveying direction of the travel way and each roller unit comprises at least one pair of motor-driven travel rollers 38 which are mounted projecting towards the longitudinal centre line of the tank and which face corresponding rollers of the side unit on the other side of the travel way.

The rotation of the rollers of the units 20 is advantageously performed by respective motors 44, via suitable toothed belts 45.

As can be clearly seen again in FIGS. 2 and 3, the roller units are movable so as to displace the rollers 38 from an advanced operating position (shown in broken lines in the figures), where the runners of the skid rest on the rollers and the skid may be moved by suitable known displacement means along the travel way, into a retracted non-operating position (shown in solid lines in the figures), where the rollers free the vertical space above the tank so as to allow the skid and the chassis to pass vertically, without obstacles, between the two roller units for treatment inside the tank. Advantageously, the displacement of the roller units between the operating position and non-operating position is performed by means of respective motors 46 and suitable rack drives 47.

Obviously, before retraction of the roller units into the non-operating position, the weight of the skid must be supported by the platform 22.

Figure 5:
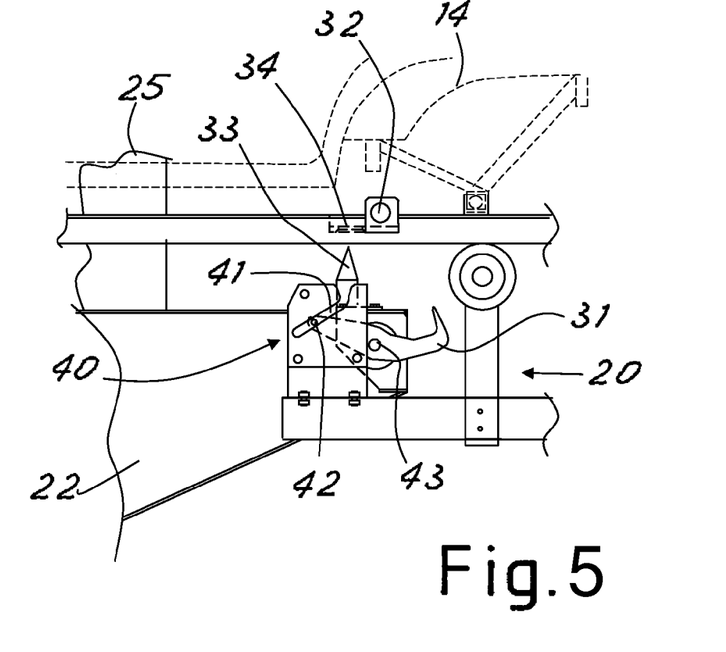
FIGS. 5 and 6 show partial schematic views of an engaging mechanism of the station according to the invention during two operating steps.
Figure 6:
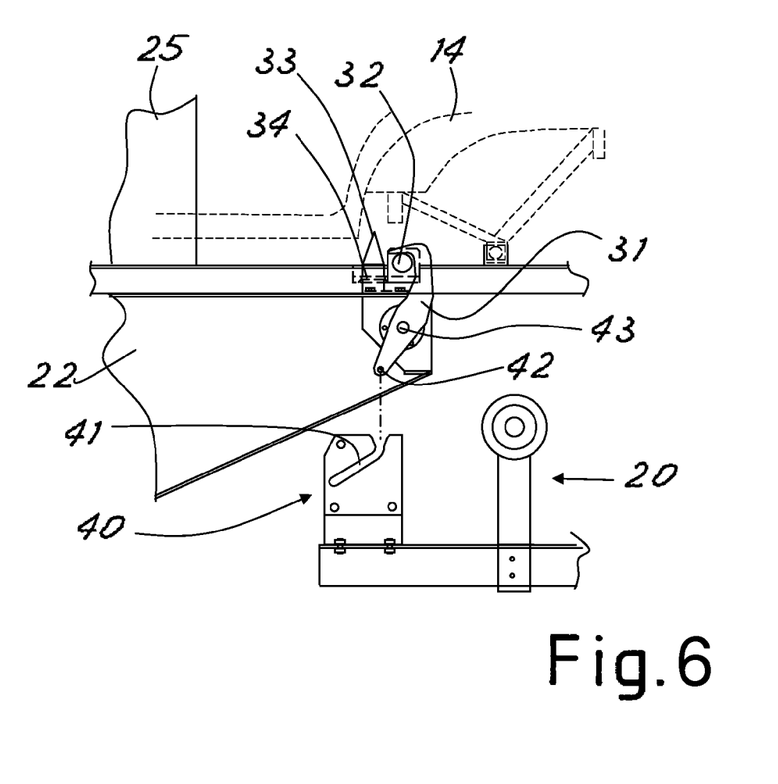

As can be seen in particular in FIGS. 1, 2 and 3 and, on a larger scale, in FIGS. 5 and 6, advantageously each roller unit comprises actuating cams 40 for actuating the locking hooks 31. Advantageously the cams are in the form of plates with a cam slit 41 inside which an actuating pin 42 laterally projecting from an operating end of the hook, rotatably supported about an axis 43 parallel to the axis of rotation of the platform, can be suitably inserted and displaced.

As can be clearly seen from a comparison of FIGS. 5 and 6, operation is thus performed so as to cause automatic engagement of the skid when the platform raises the skid from the rollers 38 and causes automatic disengagement of the skid when the platform repositions the skid on the rollers 38.

Figure 7:
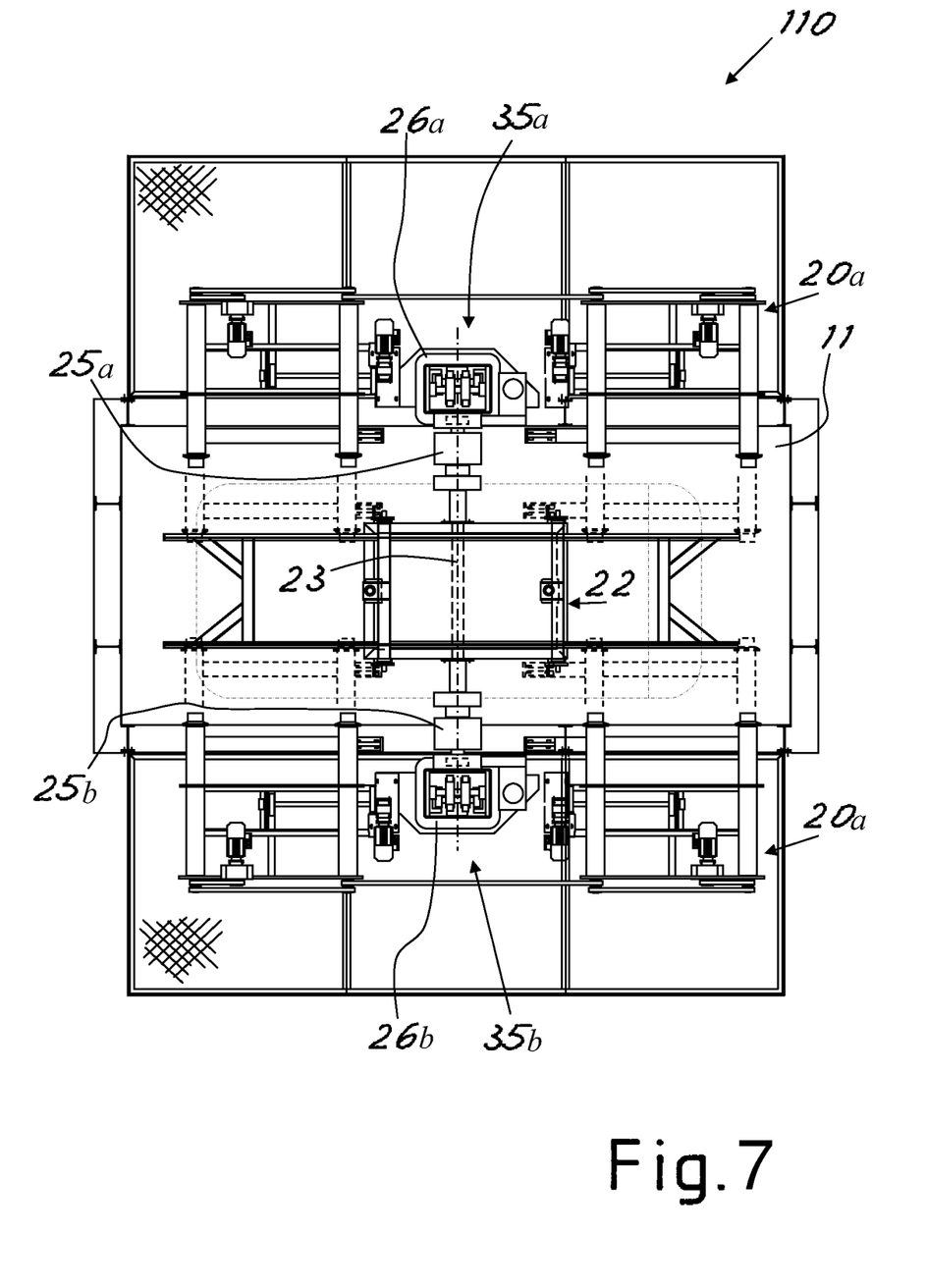
FIG. 7 shows a plan view of a variation of embodiment of a station according to the invention.

As can be seen in FIG. 7, which shows a variation of embodiment of the station (denoted generally by 110), two arms 25*a*, 25*b* for raising the platform 22 may be provided, said arms being situated at the two ends of the shaft 23 for rotation of the platform, essentially duplicating in a minor arrangement the vertical movement system of the station 10, by using two carriages 26*a*, 26*b* which travel in a synchronized manner on facing vertical pillars 35*a*, 35*b* on the two sides of the travel way.

This may be useful in the case, for example, of particularly heavy chassis.

The station 110 will not be further described in detail since, except for duplication of the vertical movement system and the consequent obvious modifications to the side roller unit 20*b* (which becomes a mirror image of the unit 20a), the various components of the station 110 are substantially the same as those already described above for the station 10, as can now be easily imagined by the person skilled in the art.

During use of the station (10 or 110), at the start of a chassis treatment cycle the platform is in the position shown in FIG. 5, with the roller units in the operating positions and the hooks open. In this condition, the platform (situated immediately below the travel plane of the conveying line) does not hinder displacement on the rollers of the incoming skid.

When the skid is in position on the platform as shown in FIG. 5, the platform may be raised (since it has dimensions which allow it to travel vertically without interfering with the rollers in the operating position, as can be clearly seen in FIG. 3). The centring pins 32, if present, engage inside the seats 34 on the skid and the skid is raised by the platform. When the skid is sufficiently raised, the actuating pins 42 are completely disengaged from the cam slits 41 and the skid is locked and completely supported by the platform, as can be clearly seen in FIG. 6.

Thereafter, the roller units are able to be retracted into their non-operating positions shown in solid lines in FIGS. 2 and 3.

The platform may thus move vertically so as to immerse the chassis in the liquid of the tank, if necessary with rotation of the platform so as to have programmed inclination movements (for example so as to immerse the inclined chassis endwise) and also overturn it completely (as shown in broken lines in FIG. 1).

The chassis may also be brought back into the horizontal or straight position or immersed horizontal or straight, as shown in broken lines in FIG. 2. Also combinations of all these movements may be performed in order to achieve more rapid evacuation of the air from the chassis and uniform coating with the process liquid. The station may also be suitably programmed so as to perform easily different optimum movements depending on the chassis to be processed.

Advantageously, in the case of a chassis with a form which allows complete overturning, the axis of rotation of the platform may be kept outside the tank (as can be clearly seen in FIG. 1) during the pivoting and rotational movements. The hydraulic seal around the shaft is thus subject to less stress.

If required, also in the case of immersion with the chassis only inclined, the rotation of the shaft may be performed only before and after immersion. In this way the hydraulic seals between shaft and supports may be less complex, it being required to provide a hydraulic sealing action only in static and not dynamic conditions At the end of the dip treatment step, the platform may be raised again (once again with all the rotational and/or inclined movements considered suitable for the chassis being processed) until it is brought back horizontal in the emersed position shown in FIG. 6.

The roller units may then be brought into their advanced operating positions and the platform may be lowered again into the position shown in FIG. 5 with simultaneous engagement of the pins 42 inside the respective cams and the consequent disengagement of the skid from the platform so that it rests freely again on the conveying rollers. Operation of the motors for rotation of the rollers pushes the skid with the chassis towards the exit from the station which is thus ready to receive the next skid with a new chassis to be processed.

At this point it is clear how the predefined objects have been achieved. For example, a high degree of flexibility may be achieved with a station constructed in accordance with the principles of the present invention, it being possible to perform movements of the chassis during immersion, emersion and positioning within the liquid, whereby these movements have been found to be optimum for optimizing the speed, quality of treatment and stress acting on the chassis. Moreover, the station is relatively simple and has limited dimensions.

Obviously, the above description of an embodiment applying the innovative principles of the present invention is provided by way of example of these innovative principles and must therefore not be regarded as limiting the scope of the rights claimed herein.

For example, entry and exit of the chassis may also take place at only one end of the station (even though this may be disadvantageous in terms of the speed of entry and exit of the chassis). Moreover other systems may be provided for locking the skid on the platform, for example in the form of motorized actuators for locking hooks.

Finally, "skid" is understood as referring to a generic component which allows the movement and engagement of a chassis and may be different from that shown, whereby it may also be even at least partially dispensed with or form part of the chassis itself.

The invention claimed is:

1. A chassis dip treatment station, comprising:
   a process liquid tank;
   a conveying line configured to convey in sequence a plurality of skids inside and outside of the station, the skids each configured to support a chassis to be treated, the conveying line comprising roller units for displacing the skids, the skids configured to move between an operating position, for supporting and displacing the skids above the process liquid tank, and a retracted non-operating position, for immersing one of the skids with the chassis inside the process liquid tank; and
   a system configured to vertically move the skids conveyed above the process liquid tank using the conveying line, and configured to move the one of the skids with the chassis inside and outside of the process liquid tank;
   wherein the system configured to vertically move the skids comprises a platform configured to support and engage the skids,
   wherein the platform is mounted on a motor-driven, transverse, rotational shaft,
   wherein the motor-driven, transverse, rotational shaft projects close to a bottom end of a vertical support arm, and
   wherein the vertical support arm is motor-driven for the vertical movement of the platform inside and outside of the process liquid tank.

2. The station of claim 1, wherein the platform is configured to rotate about the motor-driven, transverse, rotational shaft until the one of the skids with the chassis is rotated upside down.

3. The station of claim 1, wherein the platform comprises hooks configured to control engagement of the skids, and
   wherein the hooks are operated by the movement of the roller units between the operating position and the non-operating position.

4. The station of claim 1, wherein the platform comprises hooks configured to move between an operating position, for stable engagement of the one of the skids on the platform, and a non-operating position, where the one of the skids is disengaged, and
   wherein the station further comprises a device configured to move the hooks between the operation position and the non-operating position in order to engage the one of the skids with the platform and to disengage the one of the skids from the platform.

5. The station of claim 4, wherein each roller unit comprises cams for actuating the hooks so as to cause automatic engagement of the one of the skids when the platform raises the one of the skids from rollers of the roller unit, and automatic disengagement of the one of the skids when the platform repositions the one of the skids on the rollers.

6. The station of claim 4, wherein the hooks are four in number, and
   wherein the hooks are arranged in pairs close to corners of the platform and on opposite sides of the platform.

7. The station of claim 1, wherein the motor-driven, transverse, rotational shaft is kinematically connected, via a chain or toothed-belt drive, to a rotational motor arranged close to a top end of the vertical support arm.

8. The station of claim 1, wherein the vertical support arm is supported at a top of the vertical support arm on a motor-driven carriage that travels along a vertical guide pillar arranged alongside the process liquid tank.

9. The station of claim 1, wherein the roller units comprise a side unit on each side of the conveying line.

10. The station of claim 9, wherein each side unit comprises a front roller unit and a rear roller unit along a conveying direction of the conveying line,
    wherein each roller unit comprises at least one pair of motor-driven rollers for displacing the one of the skids,
    wherein the at least one pair of motor-driven rollers are supported projecting toward a longitudinal centerline of the process liquid tank, and
    wherein the at least one pair of motor-driven rollers face corresponding rollers of the side unit on an opposite side of the conveying line.

11. The station of claim 1, wherein the vertical support arms are two in number, and
    wherein the vertical support arms are arranged on sides of the platform so as to support the motor-driven, transverse, rotational shaft at two opposite ends.

12. The station of claim 1, wherein the platform is configured to rotate about the motor-driven, transverse, rotational shaft until the chassis is rotated upside down.

13. A chassis dip treatment station, comprising:
    a process liquid tank;
    a conveying line configured to convey in sequence a plurality of skids inside and outside of the station, the skids each configured to support a chassis to be treated, the conveying line comprising roller units for displacing the skids, the skids configured to move between an operating position, for supporting and displacing the skids above the process liquid tank, and a retracted non-operating position, for immersing one of the skids with the chassis inside the process liquid tank; and
    a system configured to vertically move the skids conveyed above the process liquid tank using the conveying line, and configured to move the one of the skids with the chassis inside and outside of the process liquid tank;
    wherein the system configured to vertically move the skids comprises a platform configured to support and engage the skids,
    wherein the platform is mounted on a motor-driven, transverse, rotational shaft,
    wherein the motor-driven, transverse, rotational shaft projects at a bottom end of a vertical support arm, and
    wherein the vertical support arm is motor-driven for the vertical movement of the platform inside and outside of the process liquid tank.

14. The station of claim 13, wherein the motor-driven, transverse, rotational shaft is connected to a rotational motor arranged at a top end of the vertical support arm.

15. The station of claim 13, wherein the motor-driven, transverse, rotational shaft is kinematically connected, via a chain or toothed-belt drive, to a rotational motor arranged at a top end of the vertical support arm.

16. The station of claim 13, wherein the platform is configured to rotate about the motor-driven, transverse, rotational shaft until the one of the skids with the chassis is rotated upside down.

17. The station of claim 13, wherein the platform comprises hooks configured to control engagement of the skids, and
  wherein the hooks are operated by the movement of the roller units between the operating position and the non-operating position.

18. The station of claim 13, wherein the platform comprises hooks configured to move between an operating position, for stable engagement of the one of the skids on the platform, and a non-operating position, where the one of the skids is disengaged, and
  wherein the station further comprises a device configured to move the hooks between the operation position and the non-operating position in order to engage the one of the skids with the platform and to disengage the one of the skids from the platform.

19. The station of claim 13, wherein the motor-driven, transverse, rotational shaft is kinematically connected, via a chain or toothed-belt drive, to a rotational motor arranged close to a top end of the vertical support arm.

20. The station of claim 13, wherein the vertical support arm is supported at a top of the vertical support arm on a motor-driven carriage that travels along a vertical guide pillar arranged alongside the process liquid tank.

* * * * *